United States Patent [19]

Long et al.

[11] Patent Number: 4,976,846

[45] Date of Patent: * Dec. 11, 1990

[54] CONVERSION OF CRUDE OIL FEEDS

[75] Inventors: Gary N. Long, Putnam Valley; Regis J. Pellet, Croton-On-Hudson; Jule A. Rabo, Armonk, all of N.Y.

[73] Assignee: UOP, Des Plaines, Ill.

[ * ] Notice: The portion of the term of this patent subsequent to Apr. 23, 2002 has been disclaimed.

[21] Appl. No.: 305,166

[22] Filed: Feb. 2, 1989

Related U.S. Application Data

[63] Continuation-in-part of Ser. No. 675,285, Nov. 11, 1984, Pat. No. 4,803,184, and a continuation-in-part of Ser. No. 37,125, Apr. 10, 1987, abandoned, which is a continuation of Ser. No. 772,616, Sep. 4, 1985, abandoned, each , said Ser. No. 675,285, and Ser. No. 772,616, is a continuation-in-part of Ser. No. 490,952, May 3, 1983, Pat. No. 4,512,875.

[30] Foreign Application Priority Data

| | | |
|---|---|---|
| Apr. 28, 1984 [EP] | European Pat. Off. | 84104814.3 |
| May 1, 1984 [AU] | Australia | 84-27568 |
| May 1, 1984 [CA] | Canada | 453238-4 |
| May 2, 1984 [JP] | Japan | 59-087978 |
| Jul. 30, 1987 [AU] | Australia | 87-75099 |

[51] Int. Cl.$^5$ ............................................. C10G 11/04
[52] U.S. Cl. .................................................... 208/114
[58] Field of Search .......................... 208/111, 114, 120

[56] References Cited

U.S. PATENT DOCUMENTS

| | | | |
|---|---|---|---|
| 2,270,044 | 1/1942 | Fulton | 44/114 |
| 2,865,842 | 2/1958 | Hirschler | 208/114 |
| 3,240,697 | 3/1966 | Miale | 208/120 |
| 3,974,062 | 8/1976 | Owen | 208/251 R |
| 4,002,557 | 1/1977 | Owen | 208/251 R |
| 4,035,285 | 7/1977 | Owen | 208/56 X |
| 4,158,621 | 6/1979 | Swift | 208/114 |
| 4,310,440 | 1/1982 | Wilson | 252/435 |
| 4,340,465 | 7/1982 | Miller | 208/120 |
| 4,359,595 | 11/1982 | Rollman | 585/640 |
| 4,390,415 | 6/1983 | Myers | 208/113 |
| 4,405,445 | 9/1983 | Kovach | 208/120 |
| 4,440,871 | 4/1984 | Lok | 502/214 |
| 4,496,785 | 1/1985 | Miller | 585/640 |
| 4,499,327 | 4/1985 | Kaiser | 585/640 |
| 4,512,875 | 4/1985 | Long et al. | 208/114 |
| 4,556,645 | 12/1985 | Coughlin | 502/66 |
| 4,569,833 | 1/1986 | Gortsema | 423/305 |
| 4,666,875 | 5/1987 | Pellet et al. | 502/65 |
| 4,683,050 | 7/1987 | Ward | 208/110 |
| 4,734,185 | 3/1988 | Pellet et al. | 208/114 |
| 4,803,184 | 2/1989 | Long et al. | 502/63 |

OTHER PUBLICATIONS

Pellet et al., "Skeletal Rearrangement Reactions of Olefins, Paraffins and Aromatics over Aluminophosphate-Based Molecular Sieve Catalyst," published in ACS Symposium Series 368, *Perspective in Molecular Sieve Science*, (Am. Chem. Soc., Washington, D.C., 1988).

Wilson et al., "Aluminophosphate Molecular Sieves: A New Class of Microporous Crystalline Inorganic Solids", *Journal of American Chemical Society*, vol. 104, pp. 1146–1147, (1982).

Flanigen et al., "Aluminophosphate Molecular Sieves and the Periodic Table," in *New Developments in Zeolite Science and Technology* (Murakami Iijima and Ward, Eds.), Proceedings of the 7th Intl. Zeolite Conference, pp. 103 et seq. (Elsevier, N.Y. City, 1986).

Lok et al., "Silicoaluminophosphate Molecular Sieves: Another New Class of Microporous Crystalline Inorganic Solids," *Journal of American Chemical Society*, vol. 106, pp. 6092–6983, (1984).

Breck in *Zeolite Molecular Sieves*, pp. 632–645, (John Wiley & Sons, N.Y.C., 1974).

Pines, "Prediction of Cracking Catalyst Behavior by a Zeolite Unit Cell Size Model," Journal of Catalysis, vol. 85, pp. 466–475, (1984).

Magee, "Octane Catalysts Contain Special Sieves," *Oil & Gas Journal*, May 27, 1985, pp. 59–64.

*Primary Examiner*—Asok Pal
*Attorney, Agent, or Firm*—Vincent J. Vasta, Jr.; Thomas K. McBride; John F. Spears, Jr.

[57] ABSTRACT

The process for conversion of crude oil feeds with catalysts comprising a Y zeolite-based cracking catalyst and at least one silicoaluminophosphate molecular sieve of U.S. Pat. No. 4,440,871, optionally including an aluminophosphate molecular sieve of U.S. Pat. No. 4,310,440.

22 Claims, No Drawings

CONVERSION OF CRUDE OIL FEEDS

CROSS REFERENCES TO RELATED APPLICATIONS

This application is a continuation-in-part application of U.S. Ser. No. 675,285, filed Nov. 11, 1984, to issue on Feb. 7, 1989 as U.S. Pat. No. 4,803,184, and of U.S. Ser. No. 037,125, filed Apr. 10, 1987, now abandoned, which is a continuation of U.S. Ser. No. 772,616, filed Sept. 4, 1985, now abandoned, each of said Ser. Nos. 675,285 and 772,616 being continuation-in-part applications of U.S. Ser. No. 490,952, filed May 2, 1983, now U.S. Pat. No. 4,512,875.

FIELD OF THE INVENTION

The instant process relates to a new process for the conversion of crude oils by catalytic cracking comprising contacting said crude oil with a catalyst comprising at least one non-zeolitic molecular sieve selected from the group consisting of silicoaluminophosphates, optionally including aluminophosphates.

BACKGROUND OF THE INVENTION

There is a continuing demand for refinery products, including gasoline, distillates (e.g., diesel and jet fuels) and gaseous fuels. Because of this ongoing need for petroleum products, petroleum refiners are often forced to work with heavier, often hydrogen deficient, and high impurity feeds or simply wish to maximize the salable products from the raw materials. Also, there is a growing pressure to utilize every fraction of the crude oil including light refinery gases and residues, in the effort to optimize liquid fuel production.

U.S. Pat. No. 4,440,871 discloses a novel class of crystalline microporous silicoaluminophosphates. U.S. Pat. No. 4,310,440 discloses a novel class of crystalline aluminophosphates. These novel molecular sieves are disclosed as generally employable in catalytic cracking processes but no mention is made of employing such molecular sieves in conjunction with zeolitic aluminosilicate cracking catalysts.

In U.S. Ser. No. 772,858, now U.S. Pat. No. 4,734,185, filed concurrently with a parent of the present application and commonly assigned, a catalytic cracking process is disclosed using mixed catalysts comprising zeolitic aluminosilicates and at least one molecular sieve, including the molecular sieves of U.S. Pat. No. 4,440,871 characterized by an adsorption of isobutane of at least 2 percent by weight at a pressure of 500 torr and a temperature of 20° C. Further, in U.S. Ser. No. 861,758, now U.S. Pat. No. 4,666,875, filed concurrently with a parent of the present application and commonly assigned, there is disclosed a process for the cracking of crude oil feedstock with a molecular sieve characterized by an adsorption of isobutane of at least 2 percent by weight at a pressure of 500 torr and a temperature of 20° C.

SUMMARY OF THE INVENTION

The instant process relates to a process for the catalytic cracking of a crude oil, e.g., crude oil, syncrudes, shale and tar sand oils and the like, and generally comprises contacting the crude oil with a catalyst containing a zeolitic aluminosilicate and a non-zeolitic molecular sieve (as hereinafter defined) at effective catalytic cracking conditions. In one embodiment the catalyst contains a Y zeolite-based cracking catalyst and at least one silicoaluminophosphate, optionally in combination with at least one aluminophosphate.

DETAILED DESCRIPTION OF THE INVENTION

The present invention relates to the conversion of a crude oil feed to hydrocarbon products by use of a non-zeolitic molecular sieve catalyst wherein such crude oil feed is contacted with a catalyst comprising at least one molecular sieve selected from the group consisting of silicoaluminophosphates, optionally also comprising aluminophosphates. In one embodiment a crude oil feed is contacted with a catalyst comprising a zeolitic aluminosilicate and at least one molecular sieve selected from the group consisting of silicoaluminophosphates, optionally also comprising at least one molecular sieve selected from the aluminophosphates. An objective of the present invention is to improve product quality, e.g., by increasing the octane number of a gasoline fraction such as light gasolines, preferably without suffering the loss in yield which normally accompanies catalytic cracking processes which increase octane. While not wishing to be bound by theory, it appears from the comparative data which have been considered to date that in the embodiments employing zeolites in combination with silicoaluminophosphates the zeolites perform the primary cracking role while the silicoaluminophosphates operate upon the cracked products (perhaps by isomerization or similar processes to improve product quality without any significant further conversion.

The term "crude oil feed" is used herein to denominate any full range crude oil from primary, secondary or tertiary recovery from conventional or offshore oil fields. The term "crude oil feed" may also include any full range "syncrude" such as those that can be derived from coal, shale oil, tar sands and bitumens. The crude may be virgin (straight run) or generated synthetically by blending. It is generally desirable, however, to first desalt the crude since sodium chloride is known to be a poison for most cracking operations. Further the term "crude oil feed" is meant to include component parts of the crude which are generally employed as catalytic cracking feeds or potential feeds therefore and include feeds such as distillate gas oils, vacuum gas oils, atmospheric and vacuum residual oils, syncrudes (from shale oil, tar sands, or coal) and fractions boiling above the traditional end of the gasoline boiling range, which generally includes compounds containing greater than about eleven carbon atoms and combinations thereof.

When a "zeolitic aluminosilicate" is employed herein, such refers to zeolitic aluminosilicate cracking catalyst as traditionally employed heretofore in the conversion of various feedstocks to hydrocarbon products. The zeolitic aluminosilicate component of the catalysts of this invention may be any zeolitic aluminosilicate heretofore employed as a component in cracking catalysts which are employed to produce gasoline-range products and light cycle oil or distillate fuels. Representative of the zeolites disclosed heretofore as employable in cracking catalysts are Zeolite Y, Zeolite X, Zeolite beta (U.S. Pat. No 3,308,069), Zeolite KZ-20 (U.S. Pat. No. 3,445,727), Zeolite ZSM-3 (U.S. Pat. No. 3,415,736) Zeolite LZ-10, faujasite, other ZSM-type zeolites and mixtures thereof.

This zeolitic catalyst is preferably a Y zeolite-based cracking catalyst, since more than approximately 90 percent of all commercially successful zeolitic cracking catalysts are based upon zeolite Y. Such cracking catalysts are prepared from zeolite Y (as disclosed, for example, in U.S. Pat. No. 3,130,007) and from Y-type zeolites, encompassing not only zeolite Y, but species sufficiently closely related in framework structure and chemical composition to zeolite Y species to be capable of treatment to have corresponding cracking activity. For example, Pine et al. reported in "Prediction of Cracking Catalyst Behavior by a Zeolite Unit Cell Size Model," *Journal of Catalysis*, Vol. 85, pp. 466–76 (1984) that for various derivatives of zeolite Y, the stability of the zeolite and catalyst activity and selectivity could be correlated against a single parameter, the "unit cell constant" of the steam deactivated catalyst, which was a measure of the silica to alumina ratio actually found in the zeolite crystal structure. The background of octane-enhancing zeolite catalysts based upon zeolite Y and the structure and performance of ultrastable zeolite Y are discussed by Magee et al. in "Octane Catalysts Contain Special Sieves," *Oil & Gas Journal*, May 27, 1985, pp. 59–64. Y zeolite-based cracking catalysts are prepared by treating Y-type zeolites by calcining, steaming, cation exchange and similar processes to produce the desired type and degree of catalytic cracking activity.

Representative Y-type zeolites believed employable herein include but are not limited to those disclosed in U.S. Pat. Nos.: 3,130,007; 3,835,032; 3,830,725; 3,293,192; 3,449,070; 3,839,539; 3,867,310; 3,929,620; 3,929,621; 3,933,983; 4,058,484; 4,085,069; 4,175,059; 4,192,778; 3,676,368; 3,595,611; 3,594,331; 3,536,521; 3,293,192; 3,966,643; 3,966,882 and 3,957,623. Zeolite LZ-10 is a modified Y zeolite disclosed in U.S. Pat. No. 4,401,556. Preferred species include ammonium-exchanged Y zeolite (U.S. Pat. No. 3,130,006), rare earth-exchanged Y zeolite (RE-Y, U.S. Pat. No. 3,957,623) and ultrastable (e.g., steam-stabilized) Y zeolite (U.S. Pat. No. 3,293,129 and RE 28,629 of U.S. Pat. No. 3,402,996). Catalysts containing RE-Y zeolites generally produce high gasoline yield, but relatively low octane number, while the ultrastable Y zeolites produce higher octane ratings but lower yield.

Another zeolitic aluminosilicate employable herein is "LZ-210", a modified Y zeolite, as described in EPC Application No. 81110620,3, having EPC Publication No. 82.211 and published June 29, 1983 and in U.S. Pat. No. 4,503,023, said application and said patent being incorporated herein by reference thereto.

The term "ZSM-type" zeolites is generally employed in the art to refer to those zeolitic aluminosilicates denominated by the nomenclature "ZSM-n" where "n" is an integer. The ZSM-type aluminosilicates include but are not limited to ZSM-5, ZSM-11, ZSM-12, ZSM-23, ZSM-35, ZSM-38, ZSM-48; and other similar materials having framework structures and chemicals resembling those of at least one of the species listed above.

ZSM-5 is described in greater detail in U.S. Pat. No. 3,702,886 and Re 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern hereof, is incorporated herein by reference.

When such a zeolitic component is employed herein, it is generally intimately dispersed in a matrix with the non-zeolitic molecular sieve. Alternatively, the non-zeolitic molecular sieve can be used in finely-divided form as an additive to the zeolitic component.

The silicoaluminophosphates and aluminophosphates employed in the processes of the instant invention are disclosed, respectively, in U.S. Pat. No. 4,440,871 and U.S. Pat. No. 4,310,440, said patents being incorporated herein by reference thereto.

The silicoaluminophosphate molecular sieves of U.S. Pat. No. 4,440,871 (denominated therein as "SAPO-n" where "n" is an integer) are disclosed as microporous crystalline silicoaluminophosphates the pores of which are uniform and have nominal diameters of greater than about 3 Angstroms and whose essential empirical chemical composition in the as-synthesized and anhydrous form is $mR:(Si_xAl_yP_z)O_2$ 

wherein "R" represents at least one organic templating agent present in the intracrystalline pore system; "m" has a value of from 0.02 to 0.3; "m" represents the moles of "R" present per mole of $(Si_xAl_yP_z)O_2$; "x", "y" and "z" represent the mole fractions of silicon, aluminum and phosphorus respectively, present as tetrahedral oxides, said mole fractions being such that they are within the pentagonal compositional area defined by points A, B, C, D and E of the ternary diagram which is FIG. 1 of the drawings of U.S. Pat. No. 4,440,871. Further, such may be calcined at a temperature sufficiently high to remove at least some of the organic templating agent present in the intracrystalline pore system. Further, the silicoaluminophosphate molecular sieves of U.S. Pat. No. 4,440,871 may be characterized as silicoaluminophosphate material having a three-dimensional microporous framework structure of $PO_2^+$, $AlO_2^-$ and $SiO_2$ tetrahedral units, and whose essential empirical chemical composition on an anhydrous basis is:

$mR:(Si_xAl_yP_z)O_2$ 

wherein "R" represents at least one organic templating agent present in the intracrystalline pore system; "m" represents the mole of "R" present per mole of $(Si_xAl_yP_z)O_2$: "x", "y" and "z" represent, respectively, the mole fractions of silicon, aluminum and phosphorus present in the oxide moiety, said mole fractions being within the compositional area bounded by points A, B, C, D and E on the ternary diagram which is FIG. 1 of U.S. Pat. No. 4,440,871, said silicoaluminophosphate having a characteristic X-ray powder diffraction pattern which contains at least the d-spacings set forth in any one of Tables I, III, V, VII, IX, XII, XV, XVII, XXI, XXIII or XXV of U.S. Pat. No. 4,440,871.

The aluminophosphate molecular sieves of U.S. Pat. No. 4,310,440 (denominated therein as "AlPO$_4$-n" where "n" is an integer) are generally described as being crystalline aluminophosphates having a framework structure whose chemical composition expressed in terms of mole ratios of oxides is Al$_2$O$_3$:1.0±0.2 P$_2$O$_5$ each of said framework structures being microporous, in which the pores are uniform and have nominal diameters within the range of about 3 to about 10 Angstroms, an intracrystalline adsorption capacity for water at 4.6 torr and 24° C. of at least 3.5 weight percent, the adsorption and desorption of water being completely reversible while retaining the same essential framework topology in both the hydrated and dehydrated state.

As above noted, members of the classes of SAPOs and AlPO$_4$'s are characterized simply by referring to such members as SAPO-5, SAPO-11, AlPO$_4$-5, AlPO$_4$-11, etc, i.e., a particular species will be referred to as "AlPO$_4$-n" or "AlPO<-n" where "n" is a number specific to a given class member as its preparation is reported in U.S. Pat. Nos. 4,440,871 and 4,310,440. This designation is an arbitrary one and is not intended to denote structure or relationship between a SAPO or AlPO$_4$ or to another material(s) which may also be characterized by a numbering system.

In carrying out the instant process the non-zeolitic component may be admixed (blended) with other materials which may provide some property which is beneficial under process conditions, such as improved temperature resistance or improved catalyst life by minimization of coking or which is simply inert under process conditions. Such materials may include synthetic or naturally occurring substances as well as inorganic material such as clays, silicas, aluminas, metal oxides and mixtures thereof. In addition, materials such as silica sols, alumina sols, silica-alumina, silica-magnesia, silica-zirconia, silica-thoria, silica-berylia, silica-titania, as well as ternary compositions, such as silica-alumina-thoria, silica-alumina-zirconia and clays, may be employed.

The relative proportions of the above materials and the non-zeolitic content may vary widely between about 1 and about 99 percent by weight of the final catalyst composite.

The silicoaluminophosphates, aluminophosphates and the zeolitic aluminosilicate component(s) may be modified in activity by mixing with a matrix material having significant or only slight or no catalytic activity. It may be one providing a beneficial effect as observed in large molecule cracking with a large pore material which may act as a coke sink. Catalytically active inorganic oxide matrix materials are particularly desired because of their porosity, attrition resistance and stability under the cracking reaction conditions generally encountered in a fluid catalyst cracking operation. Inorganic oxide gels suitable for this purpose are fully disclosed in U.S. Pat. No. 3,140,253 issued July 7, 1964, and such disclosure is incorporated herein by reference.

In one embodiment a crude oil feed is contacted with a catalyst at effective cracking conditions wherein the catalyst comprises at least one zeolitic aluminosilicate as generally employed in cracking catalysts and at least one molecular sieve selected from the group of silicoaluminophosphates of U.S. Pat. No. 4,440,871, optionally also including at least one molecular sieve selected from U.S. Pat. No. 4,310,440.

Both the silicoaluminophosphates and aluminophosphates include species having pore sizes ranging from small to large, have various framework structures and vary in their chemical composition, acidity and other properties. All the silicoaluminophosphates can be classified as mildly acidic. It appears that the elements silicon, aluminum and phosphorus which with oxygen form the framework constituents of these molecular sieves are responsible for this mild acidity, which is suitable for catalyzing isomerization and structural rearrangement as opposed to cracking. Thus, the silicoaluminophosphates are suitable additives to cracking catalysts to improve product quality. While not wishing to be bound by theory, it is presently believed that these non-zeolitic molecular sieves, in addition to any intrinsic cracking ability they may possess, act upon the cracked products of zeolitic cracking catalysts contacted with various crude oil feedstocks, improving product quality thereby. Examples of catalytic cracking presented below illustrate that the silicoaluminophosphates can be employed in conjunction with conventional zeolitic cracking catalysts to improve or alter product quality, apparently by acting upon the cracked species produced by the zeolite component, since little or no conversion of the feedstock due to the presence of the silicoaluminophosphate was observed. This is believed to be at least partially due to the chemical compositions and resulting mild acidity of these species. The selectivity of medium pore silicoaluminophosphates as acid components in bifunctional catalysts employed for paraffin and cycloparaffin isomerization with low cracking activity is discussed in a recent article by applicant Pellet et al.—"Skeletal Rearrangement Reactions of Olefins, Paraffins and Aromatics over Aluminophosphate-Based Molecular Sieve Catalysts," published in ACS Symposium Series 368, *Perspectives in Molecular Sieve Science*, (Am. Chem. Soc., Washington, DC 1988). Such catalysts were found to be generally less active, but significantly more selective than the medium pore zeolites. The excellent selectivities observed are attributed to unique combinations of mild acidities and shape selectivity.

Therefore, although these sieves differ in their structures and chemical compositions, they are all believed to be useful in the catalytic cracking of crude oil feedstocks with catalysts comprising zeolitic aluminosilicates, preferably those based upon Y zeolites, together with at least one silicoaluminophosphate and, optionally, at least one aluminophosphate. Physically, as described in the literature, SAPO-34 has small-sized pores (i.e., about 4.3 Angstroms) and a framework structure which can be described as topologically related to the natural zeolite chabazite. SAPO-5 has large-sized pores (i.e., about 8 Angstroms) and a framework which can be described as topologically related to that of AlPO$_4$-5 of U.S. Pat. No. 4,310,440. SAPO-11 has medium-sized pores (i.e., about 6 Angstroms) and a framework structure which can be described as topologically related to that of AlPO$_4$-11 of U.S. Pat. No. 4,310,440. SAPO-31 has a pore size between those of these large and medium-pore species, about 7 Angstroms, and a framework structure which can be described as topologically related to AlPO$_4$-31 of U.S. Pat. No. 4,310,440. SAPO-37 has large-sized pores (i.e., about 8 Angstroms) and a framework structure closely related to that of zeolite Y and faujasite, having similar pore sizes and channels. See Lok et al. "Silicoaluminophosphate Molecular Sieves: Another New Class of Microporous Crystalline Inorganic Solids," *Journal of American Chemical Society*, Vol. 106, pp. 6092-93 (1984).

Further detailed information about the silicoaluminophosphates and aluminophosphates can be found in U.S. Pat. Nos. 4,440,871 and 4,310,440, and in the following additional literature references:

Wilson et al., "Aluminophosphate Molecular Sieves: A New Class of Microporous Crystalline Inorganic Solids", *Journal of American Chemical Society*, Vol. 104, p. 1146-47 (1982).

Flanigen et al., "Aluminophosphate Molecular Sieves and the Periodic Table," in *New Developments in Zeolite Science and Technology* (Murakami, Iijima and Ward, Eds.), Proceedings of the 7th Intl. Zeolite Conference, p. 103 et seq. (Elsevier, New York City, 1986).

Pertinent portions of the Lok et al. article (106 JACS 6092) are included herein to augment the present disclosure and provide information helpful to the selection of silicoaluminophosphate species for use as catalyst components in the present invention. These new materials have properties both of zeolites and of aluminophosphates yet are unique in many ways. The new family of silicoaluminophosphate material (SAPO-n) exhibits structural diversity, with some 13 three-dimensional microporous framework structures known to date. These include novel structures of SAPO-40, SAPO-41, and SAPO-44, structures topologically related to the zeolites chabazite (SAPO-34) and A (SAPO-42), structures topologically related to the novel structure types found in the aluminophosphates, including SAPO-5, SAPO-11, SAPO-16, and SAPO-31, and topological relatives of structures found in both zeolites and aluminophosphates, erionite (SAPO-17) and sodalite (SAPO-20).

Table I, adopted from Lok et al., 106 JACS 6092, lists the SAPO species, their pore sizes and the structure types determined from X-ray powder diffraction patterns. The template-structure relationships observed in the aluminophosphate molecular sieves are again found here. Most three-dimensional silicoaluminophosphates exhibit excellent thermal and hydrothermal stabilities. All remain crystalline after the 400°-600° C. calcination necessary to remove the organic template and free the intracrystalline-void volume for adsorption or catalysis. Like aluminophosphates, most of the silicoaluminophosphates retain their structures at 1000° C. in air and at 600° C. under 20 percent steam.

The silicoaluminophosphate molecular sieves have intracrystalline pore volumes ($H_2O$) from 0.18 to 0.48 $cm^3/g$ and adsorption pore diameters from 0.3 to 0.8 nm, spanning the range of pore volumes and pore sizes known in zeolites and in silica and aluminophosphate molecular sieves. The uniform pore dimensions defined by the crystal structure enable the use of these new materials for size- and shape-selective separations and catalysis. Properties of selected SAPO molecular sieves are given in Table I, taken from Lok et al., 106 JACS 6092.

TABLE I

Structure Type and Adsorptive Properties of Silicoaluminophosphate Molecular Sieves

| SAPO Species | Structure Type[a] | Pore Size[b] nm | Ring Size[c] | typical intracrystalline pore volume[b] cm/g $O_2$ | $H_2O$ |
|---|---|---|---|---|---|
| 5 | $AlPO_4$-5 | 0.8 | 12 | 0.23 | 0.31 |
| 11 | $AlPO_4$-11 | 0.6 | 10 or puckered 12 | 0.13 | 0.18 |
| 16 | $AlPO_4$-16 | 0.3 | 6 | d | d |
| 17 | erionite | 0.43 | 8 | 0.25 | 0.35 |
| 20 | sodalite | 0.3 | 6 | 0 | 0.40 |
| 31 | $AlPO_4$-31 | ~0.7 | 10 or puckered 12 | 0.13 | 0.21 |
| 34 | chabazite | 0.43 | 8 | 0.32 | 0.42 |
| 35 | levynite | 0.43 | 8 | 0.26 | 0.48 |
| 37 | faujasite | 0.8 | 12 | 0.37 | 0.35 |
| 40 | novel | ~0.7 | 10 or puckered 12 | 0.31 | 0.33 |
| 41 | novel | 0.6 | 10 or puckered 12 | 0.10 | 0.22 |
| 42 | zeolite A | 0.43 | 8 | d | d |
| 44 | novel | 0.43 | 8 | 0.28 | 0.34 |

[a] Structures distinguished by their characteristic X-ray powder diffraction patterns.
[b] Determined by standard McBain-Bakr gravimetric techniques after calcination (500-600° C. in air) to remove R; pore size determined from measurements on molecules of varying size (kinetic diameter from Breck's Zeolite molecular Sieves, (John Wiley & Sons, NYC 1974), page 636; pore volumes near saturation, $O_2$ at −183° C., $H_2O$ at ambient temperature.
[c] Number of tetrahedral atoms Si, Al, or P) in ring that controls pore size. When structure not known, estimated from adsorption measurements.
[d] Sufficient adsorption data is not available for SAPO-16 and -42; pore size and ring size are estimated from structural analogues $AlPO_4$-16 and zeolite A, respectively.

Two very small pore (six-membered ring) molecular sieves, SAPO-16 and SAPO-20, admit only small molecules such as water and ammonia. The silicoaluminophosphates which admit normal paraffins and exclude isoparaffins with eight-ring pore openings of about 4.3 Å are SAPO-17, SAPO-34, SAPO-35, SAPO-42, and SAPO-44.

SAPO-11, −31, −40, and −41 are medium to large in pore size. Both SAPO-11 and SAPO-41 more readily admit cyclohexane (kinetic diameter, 6.0 Å). SAPO-31 and SAPO-40 adsorb 2,2-dimethylpropane but exclude the larger triethylamine (kinetic diameter, 7.8 Å). The pore sizes of these structures are defined by either open 10-rings as in silicalite (6 Å) or puckered 12-rings, with 12-rings most probable for SAPO-31 and −40. The largest pore structures include SAPO-5 and SAPO-37, which have known structures with circular 12-ring pore openings. SAPO-37 has a structure analogous to that of zeolite Y.

The silicoaluminophosphates have been roughly classified into groups having very small, medium and large pore sizes. For the purposes of this application, these classifications will be taken to include the following approximate pore size ranges:

| Class | Pore size, Angstroms | Exemplary SAPO species |
|---|---|---|
| very small | up to 3.46 | 16, 20 |
| small | 3.47 to 5.0 | 17, 34, 35, 42, 44 |
| medium (or intermediate) | greater than 5, less than 7.8 | 11, 31, 41 |
| large | 7.8 and larger | 5, 37, 40 |

In addition to the above and published data for the silicoaluminophosphates of Lok's U.S. Pat. No. 4,440,871, the various species can be classified by pore size by applying various gas adsorption tests known in the art. The results of such tests are also published in the literature for many silicoaluminophosphates. For example, all but the small pore silicoaluminophosphates will adsorb at least 2 percent by weight of isobutane at a partial pressure of 500 torr and a temperature of 20° C. Similarly, all but the large pore species will adsorb from 0 to 5 percent by weight of triethylamine (TEA) at a partial pressure of 2.6 torr and a temperature of 22° C.; this is sometimes referred to as a TEA exclusion criterion. Medium pore sieves can be selected by applying both criteria. Only the large pore species will adsorb greater than 5 percent by weight of triethylamine at a partial pressure of 2.6 torr and a temperature of 22° C. (a TEA adsorption criterion). SAPO species with "very small" pore sizes can be excluded by applying an oxygen adsorption criterion—the adsorption of at least 4 percent by weight of oxygen at a partial pressure of 100 torr and a temperature of −186° C. The pore sizes listed here and in the literature are estimated from the molecular dimensions of the various molecules which are adsorbed or excluded under various conditions, as discussed by Breck in ZEOLITE MOLECULAR SIEVES, pp. 632–645 (John Wiley & Sons, NYC 1974) for zeolites.

The catalytic properties of the silicoaluminophosphate materials as demonstrated by the n-butane cracking values, taken from Lok et al., 106 JACS 6092 (Table II) are noteworthy. The materials in general can be classified as mildly acidic, some with unique pore selectivity properties. In some structures the acidity can be varied by controlling the synthesis conditions. As shown in Table II, the materials are substantially more active than the aluminophosphates but generally less active than their zeolite analogues.

TABLE II n-Butane Cracking Results on Silicoaluminophosphates and Other Molecular Sieves

| material tested[b] | $k_A$[a] |
|---|---|
| AlPO4-5 | ~0.05 |
| SAPO-5 | 0.2–16.1 |
| SAPO-11 | 0.2–2.0 |
| erionite[c] | 4–5 |
| SAPO-17 | 0.5 |
| SAPO-31 | 0.1–0.9 |
| chabazite[d] | ~7 |
| SAPO-34 | 0.1–3.2 |
| SAPO-35 | 0.3–1.7 |
| NH4Y[e] | ~2 |
| SAPO-37 | 1.1–1.6 |
| SAPO-40 | 2.4 |
| SAPO-41 | 1.3 |
| SAPO-44 | 1.2–2.4 |

[a]Typical pseudo-first-order rate constant in cm³/(min g).
[b]Samples were precalcined at 500–600° C. for 1–7 h except SAPO-37 and the zeolites, which were calcined in situ.
[c]Mineral zeolite erionite (Pine Valley, NV), NH4+ exchanged.
[e]Synthetic zeolite NaY (SiO2/Al2O3 = 4.8), NH4+ exchanged.

SAPO molecular sieves have tetrahedral oxide frameworks containing silicon, aluminum, and phosphorus. Mechanistically, one can consider their composition in terms of silicon substitution into hypothetical aluminophosphate frameworks. The substitution can occur via (1) silicon substitution for aluminum, (2) silicon substitution for phosphorus, or (3) simultaneous substitution of two silicons for one aluminum and one phosphorus. The net framework charge per framework silicon atom resulting from each substitution mode would be +1, −1, and 0, respectively. Preliminary studies of the SAPO materials indicate that the silicon substitutes via the second and the third mechanisms. Thus some materials have anionic frameworks with a net negative charge coupled with exchangeable cations and Bronsted acid sites.

Because of the variable presence of cations and surface hydroxyl groups and the local electronegativity differences between framework Si, Al, and P, the SAPO materials exhibit a range of moderate to high hydrophilic surface properties, encompassing those shown by the aluminophosphates and by the low silica to alumina ratio zeolites, respectively.

Because their pores are incapable of adsorbing the light hydrocarbon species which it is desired to treat under operating conditions, the SAPO species with very small pores are excluded from the present claims. However, as illustrated by the examples below, the SAPOs having small, medium and large pore sizes all improve product quality, with each group employing a different reaction mechanism. For example, the small pore species tend to selectively crack the n-paraffins in the gasoline range products, thus increasing the iso/normal ratio at the expense of some loss in yield. The medium pore species tend to produce skeletal rearrangement or isomerization, thus increasing the iso/normal ratio without a significant loss in yield. The large pore species produce increased yields of aromatic components again increasing product octane without significant loss in yield.

It has been found that in molecular sieve catalysis employing silicaluminophosphates, mild acidity favors isomerization and/or structural rearrangement rather than cracking reactions. Thus, the silicoaluminophosphates can generally be employed to improve product quality in catalytic cracking processes without producing significant conversion of either the feedstock or the cracked components produced therefrom. The silicoaluminophosphates can be used either as integral catalyst components or as catalyst additives.

The various embodiments of this invention are generally carried out at effective conversion temperatures within the range of 400° F. to about 1400° F. and more usually within the range of 700° F. to about 1200° F. at effective conversion pressures selected from within the range of below atmospheric up to several hundred pounds but normally less than 100 psig. The selection of effective catalytic cracking conditions are well known in the patent and other literature. Preferred conditions include a temperature within the range of about 800° F. to about 1150° F. and pressures within the range of atmospheric to about 200 psig and higher.

EXAMPLES

The following examples are provided to illustrate the invention but are not intended to be limiting thereof:

The zeolite LZ-210 was prepared in each example according to the disclosure of E.P.C. Publication No. 82,211, published June 29, 1983. LZ-210 is a zeolite Y, modified by silicon enrichment, which is presently in commercial use for fluid catalytic cracking (FCC). SAPO molecular sieves were prepared according to U.S. Pat. No. 4,440,871. The SAPO molecular sieves were calcined in air prior to use in the following examples. Calcination procedures for the removal of templates are disclosed in U.S. Pat. No. 4,440,871.

The catalysts prepared in the following examples were evaluated by a procedure substantially the same as ASTM D-3907. Accordingly, reference to ASTM test method D-3907 hereinafter is meant to generally refer to the procedure of the ASTM test method with the following four modifications. First, the end boiling point of the products identified as gasoline products was 431° F. Second, the nitrogen post stripping of the catalyst was at 30 milliliters/min for a period of 23 minutes to 27 minutes. Third, the conversion is the measured conversion and not the standardized conversion of the ASTM test method. Fourth, the feedstock employed in the test method had an API gravity of 24.0., an IBP (Initial Boiling Point) of 354° F., FBP (Final Boiling Point) of 1077° F. and a UOP K Factor of 11.8.

EXAMPLE 1 AND COMPARATIVE EXAMPLE (SAPO-5 WITH LZ-210)

A cracking catalyst was prepared according to the invention employing a mixture of SAPO-5 and LZ-210. In addition, a cracking catalyst containing LZ-210 was prepared as a reference catalyst. The catalysts were prepared using LZ-210, having a $SiO_2/Al_2O_3$ ratio of 9.0, and SAPO-5. SAPO-5 is representative of the class of large pore SAPOs which also includes SAPO-37 and SAPO-40. It has a structure similar to that of $AlPO_4$-5, with 12-membered rings determining the pore size. It can be seen from Table 1 that these large pore species have similar intracrystalline pore volumes, and thus similar crystal densities and porosities, which may influence the amount of space available for reactants near the active sites, permitting transition states which could lead to the formation of aromatic products. Two catalysts were prepared. Catalyst A was the reference catalyst and Catalyst B was a catalyst according to this invention. Catalyst A was prepared by slurrying 18% by weight LZ-210, 18% by weight of pseudoboehmite alumina, 60% by weight of a kaolin clay; 4% by weight of a silica and enough water to form a slurry having a 25% by weight solids content. The aforementioned percentages for the solid components are given on a dry basis. The slurry was then spray dried to obtain a fluidizable catalyst composite that would pass through a 150 micron sieve (U.S. Standard). The catalyst was then calcined at 600° C. for one hour and then steam deactivated at 740° C. for 2 hours in 100% steam. Catalyst B was prepared by mixing Catalyst A and SAPO-5. The SAPO-5 was steam deactivated at 760° C. for 2 hours in 100% steam prior to mixing with Catalyst A. The steam deactivation procedures are provided to simulate the environment experienced by commercial cracking catalysts. Catalyst B contained 10 percent by weight of SAPO-5 based on the total weight of Catalyst B.

Catalysts A and B were each evaluated according to ASTM test method D-3907. In this and in the subsequent examples the "wt.% Conversion" is the measured weight percent conversion as defined in ASTM test method D-3907 and as above discussed. The "Wt.% Gasoline" is defined as those hydrocarbons in the product from $C_5$ hydrocarbons to hydrocarbons boiling below 431° F. expressed as a weight percent of feed. The term "alkylate" herein denominates propylene, butylenes and isobutane. The "Wt.% Gas" is defined as those hydrocarbons boiling below $C_4$ in the product as a weight percent of feed. The "wt.% Coke" is defined as the residue left on the used catalyst after post stripping and is given as a weight percent of the feed. The "Wt.% $C_4$'s" is defined as the weight percent of isobutane, n-butane and butylenes of the product. The "wt.% $C_6$–$C_8$ Aromatics" is defined herein as the weight percent of benzene, ethyl benzene, toluene and xylenes in the gasoline product. The results were as shown in Table 1:

TABLE 1

| | Catalyst | |
|---|---|---|
| | Catalyst A | Catalyst B |
| Wt. % Conversion | 70.3 | 71.0 |
| Wt. % Gasoline | 50.0 | 49.3 |
| Wt. % Gasoline + Alkylate | 60.9 | 61.6 |
| Wt. % $C_6$–$C_8$ Aromatics | 14.6 | 15.4 |
| Wt. % Coke | 4.9 | 4.8 |
| Wt. % Gas | 6.2 | 6.7 |
| Wt. % $C_4$s | 9.1 | 10.2 |

The above data demonstrate that Catalyst B was comparable to Catalyst A as to Wt.% Conversion and Wt.% Gasoline while making more aromatic products which are useful in enhancing the octane of the gasoline products. Thus, it is apparent that adding a large pore SAPO such as SAPO-5 to a cracking catalyst containing zeolite LZ-210 improves product quality without adding to conversion or causing a yield loss as would be expected with prior art octane catalysts. This example illustrates that the large pore SAPO added to the cracking catalyst operates primarily upon the cracked species produced over the zeolite component, improving product quality without significant additional conversion to lighter species.

EXAMPLE 2 AND COMPARATIVE EXAMPLE (SAPO-11 WITH LZ-210)

Two catalysts were prepared wherein Catalyst C was a reference catalyst containing LZ-210, a Y-zeolite-based material, having an $SiO_2/Al_2O_3$ ratio of 9.0 and Catalyst D was a catalyst according to the invention and contained LZ-210 and SAPO-11. SAPO-11 is representative of the class of medium pore SAPOs which also includes SAPO-31 and SAPO-41. It has a structure similar to that of $AlPO_4$-11, with 10-membered rings determining the pore size of about 6 Angstroms. The three members of this class have similar intracrystalline pore volumes, as can be seen from Table I. Catalyst C was prepared by preparing a slurry containing 18% by weight LZ-210, 18% by weight of a pseudoboehmite alumina, 60% by weight kaolin clay and 4% by weight silica in enough water to obtain a slurry having 25 percent by weight solids. The slurry was then spray dried to obtain a fluidizable catalyst having its size characterized by passing through a 150 micron sieve (U.S. Standard). The catalyst was calcined at 600° C. or 1 hour and then steam deactivated at 765° C. for 2 hours in 100% steam.

Catalyst D was prepared according to the procedure employed for Catalyst C, except that 10 percent by weight kaolin clay was replaced by 10 percent by weight of SAPO-11, i.e., 50% by weight kaolin clay was employed.

Catalyst C and Catalyst D were evaluated according to ASTM test method D-3907, except that the run temperature was 850° F. instead of the 900° F. suggested by ASTM test method D-3907. The results were as shown in Table 2:

TABLE 2

| | Catalyst | |
|---|---|---|
| | Catalyst C | Catalyst D |
| Conversion: | 61.9 | 62.9 |
| Wt. % Gasoline: | 46.5 | 47.6 |
| Wt. % Gasoline + Alkylate | 55.3 | 56.7 |
| Wt. % Paraffin Analysis[1]: | | |
| Iso/normal $C_4$ | 4.8 | 5.7 |

TABLE 2-continued

| | Catalyst | |
|---|---|---|
| | Catalyst C | Catalyst D |
| Iso/normal $C_6$ | 13.6 | 17.1 |
| Iso/normal $C_7$ | 15.6 | 16.8 |
| Iso/normal $C_8$ | 7.1 | 8.1 |
| Wt. % Gas Product Analysis[2]: | | |
| Olefin/paraffin $C_3$ | 2.8 | 3.8 |
| Olefin/paraffin $C_4$ | 0.55 | 0.66 |
| Wt. % Coke | 4.1 | 4.0 |

[1]Iso paraffin to normal paraffin ratios of compounds having the indicated number of carbons.
[2]Olefin to paraffin ratio of compounds having the indicated number of carbons.

The above results demonstrate that the addition of a medium pore sieve (SAPO-11) as a component of Catalyst D provided products having comparable Wt.% Gasoline and Wt.% Gasoline + Alkylate while also providing for an increase in the iso to normal ratio of the paraffin products, thus indicating higher octane products without the SAPO additive contributing to cracking. The increase in the olefin content of the gas product, as indicated by the Gas Product Analysis, indicates a gas product having more useful and valuable olefin products. Such olefins could be used as feed for alkylation or oligomerization processes to produce additional high octane gasoline components.

EXAMPLE 3 (SAPO-5 WITH LZ-210)

Two catalysts were prepared wherein Catalyst E was a reference catalyst containing LZ-210 ($SiO_2/Al_2O_3$ ratio of 9.0) and Catalyst F was a catalyst according to this invention containing LZ-210 and the large pore SAPO-5.

Catalyst E was prepared by forming a slurry of 15% by weight LZ-210, 18% by weight of a pseudoboehmite alumina, 63% by weight kaolin clay, 4% by weight silica and enough water to form a slurry containing 25 percent by weight solids. The slurry was then spray dried, calcined and treated by the procedure employed for Catalyst C in example 2.

Catalyst F was prepared by forming a slurry of 15% by weight LZ-210, 10% by weight SAPO-5, 18% by weight of a pseudoboehmite alumina, 53% by weight kaolin clay, 4% by weight silica and enough water to form a slurry containing 25% by weight solids. The slurry was then spray dried, calcined and treated by the procedure employed for Catalyst C in example 2.

Catalyst E and Catalyst F were each evaluated according to ASTM test method D-3907. The results were as shown in Table 3:

TABLE 3

| | Catalyst | |
|---|---|---|
| | Catalyst E | Catalyst F |
| Wt. % Conversion | 77.2 | 76.8 |
| Wt. % Gasoline + Alkylate | 63.8 | 60.3 |
| Wt. % $C_6$–$C_8$ Aromatics | 33.4 | 37.8 |
| Wt. % Coke | 7.7 | 7.9 |
| Catalyst/Oil Ratio (Weight) | 5 | 3 |

The above data indicate that Catalyst F, according to this invention, was considerably more active than Catalyst E, requiring only a Catalyst/Oil ratio of 3 to achieve a conversion comparable to Catalyst E employed at a Catalyst/Oil ratio of 5. This use of forty percent less catalyst to achieve comparable conversion demonstrates the surprising increase in activity of the catalyst comprising LZ-210 and SAPO-5. Further, Catalyst F formed products containing about 4.4 percent more $C_6$–$C_8$ aromatic products in the gasoline product, with about a 3.5% reduction in the Wt.% Gasoline + Alkylate. The presence of increased amounts of aromatic products is an indication of higher octane products. Further, aromatic components are valuable as components in other chemical processes.

EXAMPLE 4 (SAPO-5 vs. ZSM-5 AS ADDITIVE)

Two catalysts were prepared wherein Catalyst G was a reference catalyst containing ZSM-5 zeolite ($SiO_2$ to $Al_2O_3$ ratio of 30), as described in U.S. Pat. No. 4,239,654, and Catalyst H was a catalyst according to this invention containing SAPO-5. The medium pore zeolite ZSM-5 is a well-known octane boost additive for FCC catalysts, which typically causes some yield loss in operation; see U.S. Pat. No. 4,309,279 and Magee et al., supra at p. 64.

A zeolite cracking catalyst component was prepared by rare earth exchanging LZ-210 by use of a solution of a mixture of rare earth chlorides. The rare earth solution contained about 46.0% by weight, expressed as rare earth oxides, with the rare earth component comprising 60.0% lanthanum ($La_2O_3$), 21.5% neodymium ($Nd_2O_3$), 10.0% cerium ($CeO_2$), 7.5% praseodymium ($Pr_6O_{11}$) and about 1.0% other rare earths. The final rare earth exchanged LZ-210 contained 9.9% by weight rare earth, measured as the oxide ($RE_2O_3$ where "RE" denotes rare earth cations). A mixture was formed by blending 14.3% by weight of the rare earth LZ-210, 80.7% of a silica-alumina (sold by Davison Division of W. R. Grace under the trademark MS13/110 and containing 86 wt. % $SiO_2$ and 13 wt. % $Al_2O_3$) and 5.0% by weight of a microcrystalline cellulose extrusion aid. This mixture was extruded, dried at 110° C. in air for 16 hours and then steam deactivated for 5 hours at 760° C. in 100% steam. The extrudates were then crushed and sized to 60 to 200 mesh (U.S. Standard).

Catalyst G and Catalyst H were prepared by mixing, respectively, 5 percent by weight of ZSM-5 and SAPO-5 octane boost additives with 95 percent by weight of the cracking catalyst component, as above prepared. The two catalysts were evaluated according to ASTM test method D-3907. The results were as shown in Table 4:

TABLE 4

| | Catalyst | |
|---|---|---|
| | Catalyst G | Catalyst H |
| Wt. % Conversion | 65.2 | 66.8 |
| Wt. % Gasoline | 42.8 | 47.3 |
| Wt. % $C_6$–$C_8$ Aromatics in Gasoline: | 11.5 | 14.1 |
| Iso/Normal ($C_6$ paraffin) | 7.3 | 11.2 |

The above data demonstrate the significant improvements in Wt. % Gasoline, Wt.% $C_6$–$C_8$ Aromatics in Gasoline and the iso to normal ratio (weight ratio) of $C_6$ paraffins at comparable conversion when a large pore SAPO (SAPO-5) is employed as an octane boost component of the cracking catalyst, as compared to the use of ZSM-5 as a catalyst component. This performance advantage is commercially significant when it is considered that ZSM-5 has been the state-of-the art octane boost additive during a period of phasing out tetraethyl lead as an octane boost additive for gasoline; see Magee et al., supra.

EXAMPLE 5 (SAPO-11+LZ-210, steamed)

Two catalysts were prepared according to the procedure employed in Example 2 for Catalyst C and Catalyst D, except that the steam deactivation temperatures were as set forth below in Table 5. Catalysts derived from the non-steam deactivated precursor of Catalyst C by changing the steam deactivation temperature are denominated "Catalyst C-n" wherein "n" is an integer. Catalysts derived from the non-steam deactivated precursor of Catalyst D are similarly denominated. The catalysts were evaluated according to ASTM test method D-3907 and the following results obtained:

TABLE 5

| | Catalyst | | | | | | | |
|---|---|---|---|---|---|---|---|---|
| | C | C-1 | C-2 | C-3 | D | D-1 | D-2 | D-3 |
| Steam Deacti. Temp. (°C.) | 765 | 690 | 715 | 740 | 765 | 690 | 715 | 740 |
| Wt. % Conv: | [1]61.9 | 74.5 | 72.1 | 67.8 | 62.9 | 70.5 | 70.7 | 66.4 |
| Wt. % Gas: | 46.5 | 52.2 | 52.5 | 50.2 | 47.6 | 51.0 | 51.3 | 49.5 |
| $C_3$ Olefin/ $C_3$ Paraffin Ratio: | 2.84 | 1.47 | 1.96 | 2.10 | 3.79 | 1.70 | 2.08 | 2.54 |
| $C_4$ Olefin/ $C_4$ Paraffin: Ratio | 0.55 | 0.30 | 0.38 | 0.42 | 0.66 | 0.33 | 0.40 | 0.47 |
| $C_6$ Ratios, Olefin/ Paraffin: | 0.257 | 0.075 | 0.107 | 0.152 | 0.265 | 0.119 | 0.099 | 0.170 |
| $C_6$ Branched/ Linear Olefin | 0.64 | 0.88 | 1.11 | 0.49 | 0.92 | 0.87 | 0.76 | 0.81 |
| $C_6$ Iso/ Normal[3] Paraffin: | 13.6 | 13.0 | 13.7 | 13.2 | 17.1 | 15.3 | 15.8 | 15.1 |

1. Run Temperature was 850° F. instead of the 900° F. of ASTM test method D-3907.
2. $C_6$ Branched olefins measured were 2-methyl-2-pentene and 2-methyl-1-pentene.
$C_6$ linear olefins measured were 1-hexene, trans-2-hexene, cis-2-hexene and trans-3-hexene.
3. $C_6$ isoparaffins measured were 2-methyl pentane, 3-methyl pentane and 2,2-dimethyl butane.
$C_6$ normal paraffin measured was n-hexane.

The above data demonstrate that catalysts containing SAPOs retain their selective nature after hydrothermal treatment. The branched to linear olefin weight ratio and the iso to normal paraffin weight ratios were higher at comparable conversions and gasoline yield for the catalysts containing SAPO-11 as compared to catalysts containing no SAPO-11, thus indicating higher octane products. Thus, the advantages derived from use of SAPOs are not significantly affected by hydrothermal deactivation conditions.

EXAMPLE 6 (LZ-10+SAPO-11)

Two catalysts were prepared wherein reference Catalyst J contained a steam stabilized Y zeolite denominated as LZ-10 and Catalyst K contained LZ-10 and the medium pore SAPO-11. LZ-10 was prepared according to U.K. Patent No. 2,014,970 and was then ammonium exchanged to enhance cracking activity.

Catalyst J was prepared by preparing a mixture containing 18% by weight LZ-10, 62% by weight kaolin clay and 20% by weight silica in enough water to form an extrudable mass. This mixture had a paste consistency and was mulled, extruded and calcined at 500° C. for 16 hours in air. The extrudates were crushed and sized so as to pass through a 60 mesh screen (U.S. Standard) and not pass through a 200 mesh (U.S. Standard) screen.

Catalyst K was prepared as was Catalyst J, except that the initial mixture was 18% by weight LZ-10, 6% by weight SAPO-11, 56% by weight kaolin clay and 20% by weight silica.

The two catalysts were evaluated according to ASTM test method D-3907 except the run temperature was 866° F.

All product ratios are given as weight ratios. The results were as shown in Table 6:

TABLE 6

| | Catalyst | |
|---|---|---|
| | Catalyst J | Catalyst K |
| Wt. % Conversion | 70.2 | 69.1 |
| Wt. % Gasoline | 50.7 | 50.1 |
| $C_3$ Olefin/$C_3$ paraffin | 1.76 | 1.86 |
| $C_4$ Olefin/$C_4$ paraffin | 0.402 | 0.382 |
| $C_4$ Iso/$C_4$ Normal paraffin | 4.12 | 4.64 |
| Wt. % Alkylate | 10.9 | 10.9 |
| $C_6$ olefin/$C_6$ paraffin | 0.154 | 0.166 |
| $C_6$ iso/$C_6$ normal paraffin[1] | 13.4 | 15.4 |
| $C_6$ Branched/$C_6$ Linear Olefin[1] | 1.18 | 1.67 |
| $C_7$ olefin/$C_7$ paraffin | 0.0769 | 0.086 |
| $C_7$ iso/$C_7$ normal paraffin[2] | 16.9 | 18.6 |
| $C_7$ Branched/$C_7$ Linear Olefin[2] | 0.739 | 0.799 |

[1]The $C_6$ isoparaffins measured were 2-methyl pentane, 3-methyl pentane and 2,2 dimethyl butane. The $C_6$ normal paraffin measured was n-hexane. The $C_6$ branched olefins measured were 3-methyl-1-pentene, 4-methyl-1-pentene, 2-methyl-1-pentene, 2-methyl-2-pentene and trans-3-methyl-2-pentene. The $C_6$ linear olefins measured were 1-hexene, cis-2-hexene, trans-2-hexene, cis-2-hexene and trans-3-hexene.
[2]The $C_7$ iso-paraffins measured were 3-methyl hexane, 2-methyl hexane and 2,4-dimethyl pentane. The $C_7$ normal paraffin measured was n-heptane. The $C_7$ branched olefins measured were determined by measuring all $C_7$ olefins and subtracting from that factor the $C_7$ linear olefins measured. The $C_7$ linear olefins measured were 1-heptene, cis-2-heptene, trans-2-heptene, cis-3-heptene and trans-3-heptene.

The above data demonstrate that Catalyst K, according to this invention, provided at comparable activity and gasoline yield a gasoline product having higher iso/normal paraffin and branched/linear olefin ratios in the $C_6$ and $C_7$ hydrocarbons, which are indicative of higher octane products than produced by Catalyst J and such product components were formed at comparable gasoline yield and conversion. Thus, the medium pore SAPO-11 again improved product quality without contributing to cracking, based upon the observed lack of yield loss. In comparison to the large pore species SAPO-5, SAPO-11 produces more iso paraffins and branched olefins rather than aromatics, possibly because the smaller pores and intracrystalline volumes of the medium pore sieves are unable to accommodate the bulky transition states required for formation of aromatics.

COMPARATIVE EXAMPLE 7 (LZ-210+AlPO4-5)

Two catalysts were prepared wherein reference Catalyst L contained LZ-210 and comparative Catalyst M contained AlPO4-5 and Catalyst L. AlPO4-5 was prepared according to U.S. Pat. No. 4,310,440.

Catalyst L was prepared by forming a mixture of 15% by weight LZ-210 ($SiO_2$ to $Al_2O_3$ ratio of 9.0), 63% by weight kaolin clay, 18% by weight alumina and 4% by weight silica. The catalyst was extruded and treated similarly to the catalysts of Example 3 except that the steam deactivation was at 765° C.

Catalyst M was prepared by blending 10% by weight of a calcined AlPO4-5 with 90% by weight of Catalyst L.

Catalyst L and Catalyst M wire evaluated by ASTM test method D-3907. The olefin/paraffin and iso/normal ratios are given as weight ratios. The results were as shown in Table 7:

TABLE 7

| | Catalyst | |
|---|---|---|
| | Catalyst L | Catalyst M |
| Wt. % Conversion | 69.9 | 67.1 |
| Wt. % Gasoline | 50.8 | 48.6 |
| $C_3$ Olefin/Paraffin | 2.87 | 2.68 |
| $C_4$ Olefin/Paraffin | 0.59 | 0.57 |
| $C_4$ Iso/Normal Paraffin | 4.36 | 4.36 |

The above data demonstrate that AlPO4-5 alone, having a similar framework topology to SAPO-5 but lacking the $SiO_2$ tetrahedral components, does not provide the benefits observed from the use of SAPO-5 in conjunction with a traditional zeolite cracking catalyst.

EXAMPLE 8 (SAPO-34 WITH LZ-210)

Three catalysts (N, 0 and P) were prepared. Catalyst N is a comparative catalyst and catalysts O and P are catalysts prepared according to the instant invention. The catalysts were formed according to the procedure employed in Example 1 except that Catalysts 0 and P employed 54 weight percent kaolin clay and the zeolite and SAPO components were as follows. Catalyst N contained 18 weight percent of an LZ-210 having an $SiO_2$ to $Al_2O_3$ ratio of 9.0. Catalyst O contained 18 weight percent of the LZ-210 employed in Catalyst N and 6 weight percent of SAPO-11. Catalyst P contained 18 weight percent of the LZ-210 employed in Catalyst N and 6 weight percent of SAPO-34. SAPO-34 is representative of small pore zeolites having 8-membered rings defining the pores, and can absorb normal paraffins, but not branched species or aromatics.

Catalysts N, O and P were steam deactivated in 100 percent steam for 2 hours and at 740° C., 740° C. and 760° C., respectively, and evaluated according to ASTM test method D-3907. The results of this evaluation were as shown in Table 8:

TABLE 8

| | Catalyst | | |
|---|---|---|---|
| | Catalyst N | Catalyst O | Catalyst P |
| Wt. % Conversion | 72.7 | 71.5 | 72.0 |
| Wt. % Gasoline | 52.7 | 51.2 | 47.7 |
| Wt. % Gas + $C_4$'s | 15.6 | 15.8 | 19.5 |

TABLE 8-continued

| | Catalyst | | |
|---|---|---|---|
| | Catalyst N | Catalyst O | Catalyst P |
| Wt. % Coke | 4.05 | 4.27 | — |

The above results demonstrate the reduced gasoline yield of catalysts containing the small pore species SAPO-34 as compared with a catalyst of the invention containing SAPO-11 or a comparative catalyst containing only LZ-210 as the active ingredient. A higher yield of gas plus $C_4$'s was obtained, however. Although this would often be a less preferred embodiment due to the loss of yield, it could be useful where maximum octane boost is needed, even at the expense of yield. By cracking the n-paraffin, the iso/normal ratio is increased albeit at the expense of yield. Additionally, the gas and $C_4$ products can be fed to alkylation and/or oligomerization sections to be used in producing additional high gasoline components.

COMPARATIVE EXAMPLE 9 (SAPO-5 vs. LZ-210)

Two comparative catalysts were prepared for evaluation according to ASTM test method D-3907. The two catalysts (Q and R) were prepared using the silicoaluminophosphate molecular sieve SAPO-5 and the zeolite LZ-210 ($SiO_2$ to $Al_2O_3$ ratio of 9.0).

After preparation of SAPO-5 the material was steam deactivated in 100 percent steam at 760° C. for 2 hours to simulate the effect of actual use in a cracking process. The LZ-210 component was then rare earth exchanged with a mixture of rare earth chlorides, as described in Example 4, to give a rare earth-exchanged LZ-210 containing 9.9 weight percent rare earth, expressed as the oxide.

A matrix for the SAPO-5 and LZ-210 was prepared by mixing 90 percent by weight of a silica/alumina, sold by the Davison Division of W. R. Grace under the trade designation MS13/110, and 10 percent by weight of a microcrystalline cellulose extrusion aid. The mixture was extruded in the form of 1/16 inch pellets and dried in air at 110° C. for about 16 hours and then steam deactivated in 100 percent steam at 760° C. for 2 hours. The steam deactivated material was then crushed and sized to 60 to 200 mesh (U.S. Standard).

The SAPO-5 and LZ-210 catalysts were each prepared by mixing 15 percent by weight of the selected material with 85 percent by weight of the matrix. The LZ-210 was steam deactivated in 100% steam at 760° C. for 2 hours prior to use in the preparation of the catalyst. The final catalyst mixtures were then calcined at 590° C. in air for 3 hours. Each catalyst was evaluated for conversion according to ASTM test method D-3907. The results of the evaluation were as shown in Table 9:

TABLE 9

| | Catalyst | |
|---|---|---|
| | SAPO-5 (Q) | LZ-210 (R) |
| Wt. % Conversion | 57.7 | 57.2 |
| Gasoline, wt. % | 37.2 | 41.4 |
| Gas, wt. % | 6.6 | 5.5 |
| Wt. % Coke | 3.9 | 3.1 |
| Wt. % $C_4$ | 10.0 | 7.33 |

The above results demonstrate the individual activity of SAPO-5 and LZ-210 as cracking catalysts. Although LZ-210 showed a higher weight percent gasoline, SAPO-5 formed more gas products and $C_4$ products under the conditions of ASTM test method D-3907. As observable from the above examples according to the instant invention, the use of a catalyst comprising a traditional zeolite cracking catalyst and a SAPO provide products having different components than the products obtained by use of a SAPO or LZ-210 separately.

EXAMPLE 10: ULTRASTABLE Y ZEOLITE WITH SAPO-31

The following example demonstrates improved catalytic cracking performance with a catalyst containing steam stabilized or ultrastable Y zeolite (USY) as the catalytic cracking component, with the medium pore silicoaluminophosphate SAPO-31 used therein as a product quality enhancer. A control cracking catalyst (Catalyst S) was prepared containing Y-82, a steam stabilized Y product commercially available from Union Carbide Corporation. The catalyst was prepared by physically mixing 72.0 g (anhydrous) Y-82 and 248 g (anhydrous) kaolin clay in a Hobart Mixer until homogeneous. Then 200 g of silica sol, (40% $SiO_2$) available commercially as Ludox LS, was gelled with 20 cc of a 10 percent aqueous ammonium acetate solution. The gelled sol was added to the clay-zeolite mixture. Distilled water was added to this composite until a mixture consistency suitable for extrusion was obtained. This paste was then extruded into 1/16" pellets, dried at 110° C. overnight and calcined for one hour at 500° C. The calcined extrudates were meshed to a size suitable for microactivity testing. A catalytic composition of the present invention (Catalyst T) was prepared by blending 0.198 g of calcined SAPO-31 powder with 4.907 g of the 60/100 mesh particles of the Y-82 containing cracking component prepared above. This mixture was prepared to contain 3.9 weight percent SAPO-31 product quality enhancer and 96.1 weight percent cracking catalyst.

In order to simulate the degradative hydrothermal effects experienced by FCC catalysts in actual commercial use, both of the catalysts described above were subjected to the following steam treatment. Both catalysts were placed in a glass tube reactor which had been preheated to 500° C. in flowing 100 percent steam. Next, the temperature of the reactor was increased to 760° C. in 100 percent steam and held at that temperature for two hours. Both catalysts were evaluated according to ASTM test method D-3907. Conversion of the feed and selectivity to gasoline products were determined. In addition the liquid products were collected and analyzed for aromatic, paraffin and olefin contents. The results of this evaluation are summarized in Table 10 below:

TABLE 10

| | Catalyst | |
|---|---|---|
| | Y-82 (S) | Y-82 + SAPO-31 (T) |
| Wt. % Conversion | 64.8 | 64.2 |
| Gasoline selectivity | 74.0 | 73.6 |
| Wt % Aromatics in Gasoline | 39.0 | 41.5 |

The above results demonstrate again that when a silicoaluminophosphate molecular sieve is present as an additive to a conventional cracking catalyst, the SAPO additive does not contribute to cracking conversion. It can also be seen from the above example that the presence of the additive does not cause a reduction in selectivity to the desirable gasoline range products. Rather, SAPO-31, with a pore size which is intermediate between the medium pore sieves (i.e., SAPO-11 and SAPO-41) and the large pore sieves (i.e., SAPO-5 and SAPO-37) produces an enhancement in gasoline product aromaticity reminiscent of that produced by the large pore SAPO molecular sieves observed in earlier examples. This very desirable enhanced aromaticity suggests that an enhanced gasoline product octane rating is achievable without gasoline yield loss as would be obtained with prior art cracking catalysts designed to increase octane. While not wishing to be bound by theory, it appears that the combination of the acidity that is often observed with the SAPO molecular sieves and the somewhat larger pore size of the -31 type structure facilitates the formation of the sterically larger aromatic molecules with little or no undesirable cracking.

EXAMPLE 11: LZ-210 ZEOLITE WITH SAPO-34.

A control cracking catalyst (Catalyst V) was prepared in a manner identical to that described in the preparation of Catalyst A of Example 1, except that unlike Catalyst A the present catalyst was steamed at 760° C. for 2 hours in 100 percent steam. Like Catalyst A, the present catalyst was prepared to contain the modified Y cracking component LZ-210 which had been silicon enriched to a $SiO_2/Al_2O_3$ ratio of 9.0. A catalyst mixture or composite of the present invention (Catalyst V) was prepared by blending calcined, unsteamed powdered SAPO-34 with the steamed LZ-210 based catalyst so as to obtain a mixture containing 5 weight percent SAPO-34 and 95 weight percent LZ-210 cracking catalyst. SAPO-34 is representative of the small pore silicoaluminophosphate molecular sieves which also include SAPO-17, SAPO-35 and SAPO-44. These sieves all possess silicon, aluminum and phosphorus as framework constituents and pore openings formed by 8-membered oxygen rings. As such they are capable of admitting normal paraffins and unbranched olefins but will not admit larger molecules.

Both catalysts were evaluated according to ASTM test method D-3907, except that tests were conducted at 850° F. and at a catalyst to oil ratio of 5. Conversion of the feed and selectivity to gasoline products were determined. In addition, the liquid products were collected and analyzed for aromatic, paraffin and olefin contents. The results of this evaluation are summarized below in Table 11, including calculated iso/normal ratios for paraffins and olefins:

TABLE 11

| | Catalyst | |
|---|---|---|
| | LZ-210 (S) | LZ-210 + SAPO-34 (T) |
| Conversion, wt % | 77.8 | 75.4 |
| Gasoline Selectivity, % | 69.4 | 66.5 |
| Gasoline Product analysis: | | |
| I/N Paraffin Ratio | 13.1 | 15.5 |
| I/N Olefin Ratio | 1.55 | 1.70 |

The above data demonstrate that the presence of the small pore additive SAPO-34 does not contribute to the cracking of the feedstock, since its presence does not enhance overall conversion; in fact, conversion is slightly reduced. However, the SAPO-34 additive does very significantly enhance the isoolefin and isoparaffin content of the gasoline range products. This increase in iso content can be expected to yield a significant boost in gasoline octane rating. However, this increase is accompanied by a slight gasoline yield loss. The observed boost in the iso content of the gasoline products is unexpected since iso or branched molecules are known to be too large to enter or exit the pores of this small pore sieve. While not wishing to be bound by theory, one might hypothesize that the enhanced iso content of the product is the result of shape selective cracking of the linear unbranched molecules which can readily enter and exit these small pore sieves. One might also conclude that given the surprising behavior of this small pore SAPO, other SAPO molecular sieves with similar chemical compositions and pore sizes might also be expected to perform similarly, producing an octane boost with some yield loss. Such catalysts could be useful in operations where the objective is to maximize product octane rating, with yield being of secondary importance.

CONCLUSIONS

The above examples demonstrate that SAPO molecular sieves with large or medium pore sizes and particularly the medium pore species, induce unique and highly beneficial catalytic effects when applied in combination with conventional zeolite cracking catalysts. Unexpectedly, the behavior of the catalysts containing both a Y zeolite-based component (of which LZ-10, USY and LZ-210 are representatives) and the chosen SAPO molecular sieves cannot be predicted from the individual behavior of the components, as shown, e.g., by Examples 1, 3 and 4 using SAPO-5. The effect of the medium pore SAPO-11 (Examples 2, 5, 6 and 8) is particularly unexpected, when one compares its effect as a cocatalyst to that of the zeolite ZSM-5. They both boost the product gasoline octane value; however, they produce different gasoline products, and the octane boost with ZSM-5 is accompanied by substantial gasoline yield loss, while with SAPO-11 the gasoline yield is not affected. It is also shown (in Example 8) that SAPO-34, a small pore molecular sieve which cannot absorb isobutane, also has a substantial cracking effect under certain operating conditions, enhancing the fragmentation of gasoline-range hydrocarbons of the products to smaller homologs, which can be used to produce high octane components. It is further shown that the beneficial effects of the chosen SAPO molecular sieves as cocatalysts is broadly applicable to both highly active and relatively inactive Y zeolite type catalyst bases, (e.g., LZ-210 vs. LZ-10), as well as steam-stabilized Y zeolite (Y-82).

The selective product-forming abilities of mixtures of a conventional catalyst base and SAPO-11 (and related medium or intermediate pore materials such as SAPO-31 and -41) are not only unique but they also represent major technoeconomic and commercial value, because such catalysts allow substantial value enhancements in octane number gain without the gasoline yield loss shown by cocatalysts known in the prior art such as ZSM-5. This is of great commercial importance, since generally an increase of one octane number in the product is more valuable than an increase of one percent in yield, and by using processes of the present invention, the numerical product of yield and octane number (or "octane barrels") is increased.

The examples also show that $AlPO_4$ molecular sieves in combination with a Y zeolite catalyst base do not impair catalytic cracking performance. It can be also reasonably conceived that $AlPO_4$ molecular sieves which have been modified to enhance their acidic activity would also perform similarly to SAPO molecular sieves of similar structure as additives to cracking catalysts, with or without the presence of the SAPO additive. Such modifications could involve replacement of framework aluminum atoms by other cationic species to create a negatively charged framework in the $AlPO_4$ materials.

In addition to the surprisingly beneficial effects shown for the use of large and medium pore SAPOs by the above examples, the examples using SAPO-34 illustrate that small pore SAPOs can also serve as useful additives to zeolitic cracking catalysts. Thus, expressed broadly, the catalysts useful in the claimed processes of the present invention encompass all the combinations of Y zeolite-based cracking catalysts with any of the SAPOs disclosed and claimed in Lok's U.S. Pat. No. 4,440,871, with the exception of those having "very small" pore sizes, due to their inability to adsorb the hydrocarbon reactants.

While not wishing to be bound by theory, the applicants believe that the observed performance of these SAPO species can be correlated with their structures and chemical compositions, and that these correlations permit predictions of the performances of other SAPO species for which examples are not yet available.

In general, the SAPO molecular sieves all have silicon, aluminum and phosphorus as framework constituents in addition to oxygen. As such they have been observed to exhibit mild or weak acidity as noted by Lok and applicants in the open literature, e.g., 106 JACS 6092. In all the examples above this weak acidity surprisingly evidences itself as a significant and valuable tendency favoring isomerization and/or skeletal rearrangements rather than skeletal cracking of hydrocarbons. Based on the examples and the observed mild acidity of the SAPO molecular sieves, it is reasonable to expect that most silicoaluminophosphate molecular sieves will show similar tendencies toward isomerization and/or skeletal rearrangement and thus be of value when used in combination with cracking catalysts to improve product quality.

In addition to the above conclusions concerning the overall SAPO chemical composition and its effect on performance it is also possible to correlate observations concerning performance as it relates to SAPO molecular sieve structures of small, medium and large pore size:

(1) Large pore as well as intermediate pore sized molecular sieves have in common pore openings which are formed by 12-membered oxygen rings which may or may not be puckered, resulting in slightly reduced or intermediate pore sizes. In addition, the large pore molecular sieves appear to have the largest available intracrystalline pore volume or void space. As observed in the examples of the present invention, the large and intermediate pore sized molecular sieves, as exemplified by SAPO-5 and SAPO-31 and further represented by SAPO-40 and SAPO-37, exhibit a unique tendency to form enhanced quantities of high octane aromatic products, which is a significant commercial advantage. This tendency is absent in the medium and small pore sieves. Thus it is possible to extrapolate from the present examples to conclude that it is likely that other molecular sieves with the large pore structure and void volume and with SAPO chemical compositions may perform in a similar manner. Under some conditions the large pore SAPOs will also crack portions of certain hydrocarbon feedstocks when used alone, but when used in suitable proportions in combination with zeolitic cracking catalysts in suitably prepared catalyst compositions these species can improve product quality (particularly in increased production of aromatics) without significant conversion by cracking. When combining the SAPO additives with zeolitic cracking zeolites it was found that co-sprayed forms (i.e., Example 3) including SAPO-5 (representative of large pore species) produced more cracking activity than catalyst compositions in which the large pore SAPO was present in physical admixture with the zeolite (i.e., Example 1). However, this effect is not expected to occur with the SAPOs having small or medium pore sizes, since their pore sizes are too small to accommodate the crackable components in the feedstock.

(2) The medium pore sieves SAPO-11 and SAPO-41, in addition to chemical composition, have in common pore openings that are formed by 10-membered oxygen rings. Furthermore, these species have significantly reduced intracrystalline void spaces and pore volumes when compared with the large pore molecular sieves. With the known structure SAPO-11 this reduced pore volume is due to the nature of the -11 type structure, which consists of unidirectional nonintersecting pores. Based on the similar pore size, crystal density and pore volume it is reasonable to assume that the yet undetermined SAPO-41 structure might also be similar in that it may consist of unidirectional channels. As observed with the medium pore SAPO-11 when used as an additive to an FCC catalyst, the gasoline products contain enhanced isoparaffin and isoolefin contents without yield loss, probably produced by isomerization of n-paraffins and linear olefins. This surprising performance is due to a combination of structure and chemical composition. It is reasonable to expect that the -41 structure or other medium pore SAPOs of yet undefined structures will perform similarly, based on the present examples. Since all the known medium pore SAPOs have unidirectional channels and rather limited void spaces, it is reasonable to expect that yet undiscovered members of this class having similar properties will have similar shape selective properties for the products of cracking reactions over zeolitic cracking catalysts.

(3) The small pore sieves (SAPO-17, 34, 35, 42 and 44) all have pore sizes defined by 8-membered rings which will exclude iso- or branched hydrocarbons, although their pore volumes can vary from relatively small to large. Conclusions about this category of molecular sieve are summarized under Example 11 for SAPO-34 above. One might expect that the enhanced iso- content of the gasoline products observed with SAPO-34 is the result of shape selective cracking of the linear unbranched molecules which can readily enter and exit this small pore sieve. Since n-paraffins are the principal reactants which can enter the pores, some of these species are cracked, increasing the iso/normal ratio at the expense of some reduction in yield. This mechanism of octane boost is not limited by thermal equilibrium, as direct isomerization of n-paraffins to isoparaffins normally is; thus, much higher product iso/normal ratios are conceptually possible. One might also expect that given the surprising behavior of this small pore SAPO, other SAPO molecular sieves with similar chemical compositions and pore sizes might also be expected to perform similarly, producing an octane boost with some yield loss.

What is claimed is:

1. The process for converting a crude oil feed comprising contacting a crude oil feed at effective catalytic cracking conditions with a catalyst comprising at least one Y zeolite-based catalytic cracking catalyst and at least one non-zeolitic molecular sieve selected from the group consisting of the silicoaluminophosphates of U.S. Pat. No. 4,440,871 which are characterized in their calcined form by adsorption of at least 4 weight percent of oxygen at a partial pressure of 100 torr and a temperature of $-186°$ C.

2. The process of claim 1 wherein the catalytic cracking catalyst contains a crystalline zeolitic cracking catalyst selected from the group consisting of ultrastable zeolite Y, ammonium-exchanged zeolite Y, zeolite LZ-210, zeolite LZ-10 and mixtures thereof.

3. The process of claim 2 wherein the crystalline zeolitic cracking catalyst comprises zeolite LZ-210.

4. The process of claim 2 wherein the crystalline zeolitic cracking catalyst is an ultrastable Y zeolite.

5. The process of claim 2 wherein the crystalline zeolitic cracking catalyst comprises zeolite LZ-10.

6. The process of claim 1 wherein the catalytic cracking catalyst comprises a rare earth-exchanged Y zeolite.

7. The process of claim 1 wherein the non-zeolitic molecular sieve is a silicoaluminophosphate selected from the group consisting of SAPO-17, SAPO-34, SAPO-35 and SAPO-44.

8. The process of claim 1 wherein said silicoaluminophosphate is selected from the group consisting of SAPO-5, SAPO-37 and SAPO-40.

9. The process of claim 1 wherein said silicoaluminophosphate is selected from the group consisting of SAPO-11, SAPO-31 and SAPO-41.

10. The process of claim 1 wherein said silicoaluminophosphate is selected from the group consisting of SAPO-5, SAPO-11 and SAPO-31.

11. The process of claim 1 wherein said catalyst further comprises at least one molecular sieve selected from the group consisting of the molecular sieve aluminophosphates of U.S. Pat. No. 4,310,440.

12. The process of claim 1 wherein said process is carried out at effective catalytic cracking conditions at a temperature between about 400° F. and about 1400° F. and a pressure less than 100 psig.

13. The process of claim 1 wherein said catalyst comprises a zeolite Y.

14. An improved cracking catalyst comprising a zeolitic aluminosilicate selected from the group consisting of Y-type zeolites, and at least one non-zeolitic molecular sieve selected from the group consisting of silicoaluminophosphates of U.S. Pat. No. 4,440,871 which is characterized in its calcined form by adsorption of at least 4 weight percent of oxygen at a partial pressure of 100 torr and a temperature of $-186°$ C.

15. A catalyst according to claim 14 wherein said catalyst comprises a Y zeolite-based cracking catalyst and a silicoaluminophosphate of U.S. Pat. No. 4,440,871.

16. A catalyst according to claim 15 wherein said zeolitic aluminosilicate is selected from the group consisting of ultrastable zeolite Y, ammonium-exchanged zeolite Y, zeolite LZ-210, zeolite LZ-10 and mixtures thereof.

17. A catalyst according to claim 15 wherein said zeolitic aluminosilicate comprises a rare earth-exchanged Y zeolite.

18. A catalyst according to claim 15 wherein said silicoaluminophosphate is selected from the group consisting of SAPO-17, SAPO-34, SAPO-35, SAPO-42 and SAPO-44.

19. A catalyst according to claim 15 wherein said silicoaluminophosphate is selected from the group consisting of SAPO-5, SAPO-37 and SAPO-40.

20. A catalyst according to claim 15 wherein said silicoaluminophosphate is selected from the group consisting of SAPO-11, SAPO-31 and SAPO-41.

21. A catalyst according to claim 15 wherein said non-zeolitic molecular sieve further comprises at least one aluminophosphate of U.S. Pat. No. 4,310,440.

22. An improved cracking catalyst comprising a zeolite Y and a silicoaluminophosphate of U.S. Pat. No. 4,440,871 which is characterized in its calcined form by adsorption of at least 4 weight percent of oxygen at a partial pressure of 100 torr and a temperature of $-186°$ C.

* * * * *